United States Patent [19]

Pasquini et al.

[11] Patent Number: 4,847,466

[45] Date of Patent: Jul. 11, 1989

[54] PLASMA TORCH HAVING A LONGITUDINALLY MOBILE ARC ROOT, AND PROCESS FOR CONTROLLING THE DISPLACEMENT THEREOF

[75] Inventors: Pierre Pasquini, Fontainebleau; Maxime Labrot, Bordeaux; Jean-Pierre Serrano, Saint Aubin du Medoc; Didier Pineau, Bordeaux, all of France

[73] Assignees: Electricite de France-Service National; Aerospatiale Societe Nationale Industrielle, both of France

[21] Appl. No.: 141,188

[22] Filed: Jan. 6, 1988

[30] Foreign Application Priority Data

Jan. 7, 1987 [FR] France .............................. 87 00078

[51] Int. Cl.[4] ............................................. B23K 9/00

[52] U.S. Cl. .............................. 219/121.59; 219/123; 219/121.52; 219/121.5; 219/75; 313/231.41; 315/111.21; 315/111.41

[58] Field of Search .................. 219/121 PQ, 121 PO, 219/121 PV, 121 PT, 75, 123, 121 PM, 121 PY, 121 P, 121 PP, 121 PR; 313/231.31, 231.41, 231.5; 315/111.21, 111.41

[56] References Cited

U.S. PATENT DOCUMENTS

| | | | |
|---|---|---|---|
| 3,360,682 | 12/1967 | Moore | 219/121 PQ |
| 4,095,085 | 6/1978 | Tomita et al. | 219/123 |
| 4,127,760 | 11/1978 | Meyer et al. | 219/121 PQ |
| 4,219,726 | 8/1980 | Meyer et al. | 219/123 |
| 4,266,113 | 5/1981 | Denton et al. | 219/121 PM |
| 4,543,470 | 9/1985 | Santen et al. | 219/121 PQ |
| 4,683,367 | 7/1987 | Drouef | 219/123 |

*Primary Examiner*—M. H. Paschall

*Attorney, Agent, or Firm*—Sughrue, Mion, Zinn, Macpeak & Seas

[57] ABSTRACT

The invention concerns plasma torches comprising an upstream electrode (12), a downstream electrode (11), a chamber (15) for the injection of plasma producing gas, a priming electrode (13) and optionally a magnetic field coil (14), in which the upstream root of the arc is displaced on the upstream electrode. According to the invention, in order to control a continuous or reciprocating and/or an oscillatory translation, the field coil is supplied with a variable direct current, if need be a pulsatory undulatory current, and/or a diffuser is placed at the inner end of the upstream electrode which is supplied with a modulated flow of gas which it causes to whirl. Application in high power plasma torches for regularizing and rendering uniform the wear of the electrodes so as to prolong the life thereof.

13 Claims, 3 Drawing Sheets

FIG. 4
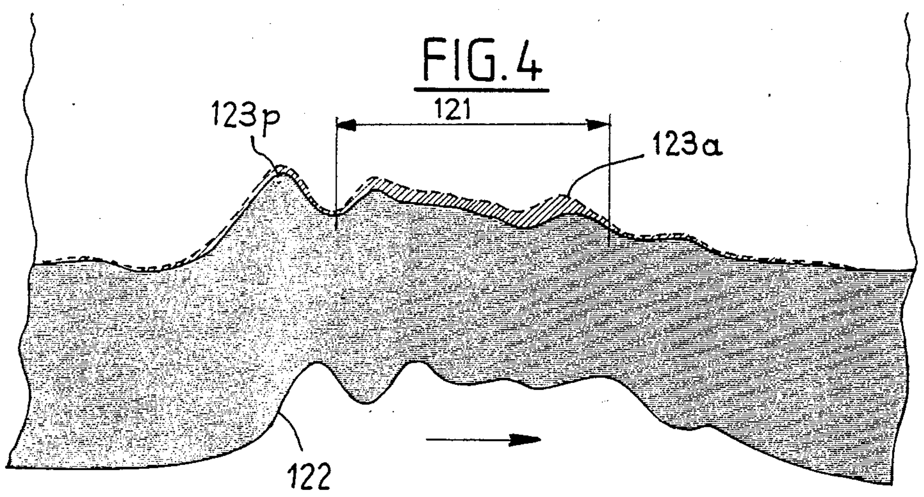
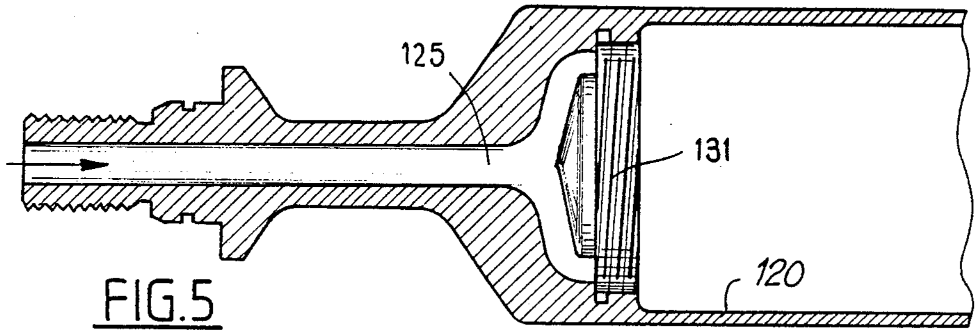
FIG. 5
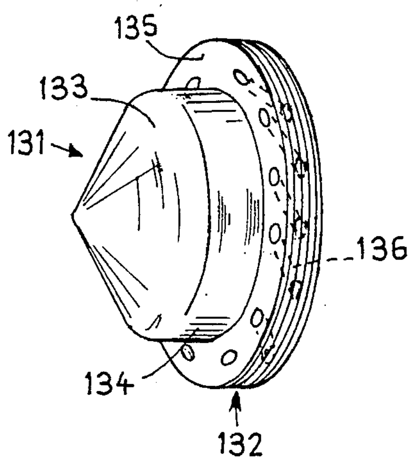
FIG. 6

PLASMA TORCH HAVING A LONGITUDINALLY MOBILE ARC ROOT, AND PROCESS FOR CONTROLLING THE DISPLACEMENT THEREOF

BACKGROUND OF THE INVENTION

1. Field of the Invention

The present invention relates to plasma torches and more particularly high power plasma torches having electrodes whose life is prolonged.

2. Description of the Prior Art

Plasma torches or plasma arc blowpipes are known in the art. This type of torch consists of two electrodes, namely an anode and a cathode which are tubular and coaxial. An arc is established between the electrodes and a plasma producing gas is simultaneously injected. The arc which is struck between the electrodes is maintained and brings the gas to a very high temperature and ionizes this gas. At the outlet of one of the electrodes, this gas has high velocity and the plasma it constitutes forms the heat-carrying agent.

The arc which is struck between the two electrodes is for example initiated by contact with the aid of an auxiliary starting up electrode and then transferred between the two tubular electrodes under the action of the whirling injection of a gas in a chamber located between the electrodes. This also ensures the rotation about itself of the root of the downstream arc for avoiding the melting of the corresponding electrode. The displacement with respect to itself of the upstream arc root is obtained by an auxiliary magnetic field produced by a coil which surrounds the upstream electrode which is in the form of a glove finger with a closed end. The upstream and downstream terms are with reference to the direction of flow of the plasma.

Some types of plasma torches deliver power between 10 and 50 kWs and those to which the invention is more particularly applicable can produce several megawatts.

Such a plasma torch comprises consumable elements: the electrodes. The life of the electrodes depends on many parameters, for example the power of the torch and more particularly the value of the arc current, the nature of the plasma producing gas injected owing to its decomposition, and the reactions it may have on the materials from which the electrodes are made. The life of the electrodes is also a function of the operation of the torch, depending on whether the latter is continuous or discontinuous. It is conventional that the life of the electrodes varies between a few tens of hours for relatively low power torches to several hundreds of hours for high power torches to which the invention relates.

The relatively short life of the electrodes is a notable drawback.

In an attempt to prolong the life of the electrodes, and in particular that of the upstream electrode, there has been proposed a solution for a plasma torch whose upstream electrode is in the form of a glove finger with a closed end. According to this solution, for the purpose of acting on the wear by erosion of the electrodes, there has already been used a source of alternating current or there has already been injected plasma producing gas in the chamber between the electrodes while varying its pressure.

This apparently interesting technique is however far from completely avoiding the aforementioned drawback.

Indeed, although the life of the electrode is increased somewhat, this electrode becomes too locally worn. It would be possible to increase the worn area by increasing variations in the rate of flow of the plasma producing gas, but said variations in the flow would have an adverse effect on the constancy of the power delivered by the torch.

It has been found that, for a torch of a given power, the consumption of the mass of the electrode was an increasing function of the current and that the length of the arc was also an increasing function of the voltage. It will therefore be understood that if it is desired to increase, for a constant consumption of electrode, the power of the torch, the voltage would have to be increased, with an accompanying increase in the length of the arc, i.e. in the overall size of the installation. For practical reasons, one cannot exceed certain limits. Solutions must therefore be envisaged which permit an increase in the length of the arc while keeping as far as possible the length of the torch constant.

SUMMARY OF THE INVENTION

An essential object of the invention is to regularize the wear of the upstream electrode and for this purpose to control the place at which the arc root is attached to the upstream electrode.

The invention provides a process for regularizing the wear so as to prolong the life of an electrode of a plasma torch comprising two tubular electrodes which are coaxial with each other and between which an arc is established and which are separated by a chamber in which plasma producing gas is injected, wherein the displacement of the root of the arc on the upstream electrode relative to the direction of flow of the plasma, is controlled so as to cause it to sweep longitudinally in a reciprocating manner along a part of the inner surface of the upstream electrode, the reciprocation occurring at the frequency of about 1 Hz or less.

According to the invention, this sweeping is discrete and stepped or continuous and progressive and occurs in a single or multiple travel accompanied, as the case may be, by an oscillation or vibration of the root of the upstream arc on itself around each of the various positions it occupies in the course of its sweeping over the electrode.

The invention also provides a plasma torch comprising two tubular electrodes which are coaxial with each other and between which an arc is established, a chamber separating the electrodes in which a plasma producing gas is injected, means for controlling the displacement of the upstream root on the upstream electrode with respect to the direction of flow of the plasma, so as to cause it to travel through a longitudinal path in a reciprocating manner whereby the wear is regularized and the life of the upstream electrode is prolonged, and a magnetic field coil which locally surrounds the upstream electrode and is supplied with power by an electric circuit, wherein said means comprise, inserted in said circuit, rectifiers delivering a pulsatory undulatory direct current from a set value of pulsatory undulatory coil current.

The following description is of a particular non-limitative embodiment of the invention and is applicable to any torch power.

Further features of the invention will be apparent from the following description with reference to the accompanying drawings, which are given merely by way of example and in which:

FIG. 4 is a graph illustrating to a much enlarged scale the manner in which the upstream electrode becomes worn;

FIG. 5 is a partial sectional view of the upstream end of an upstream electrode according to the invention, and FIG. 6 is a diagrammatic perspective view of the configuration of an embodiment of the diffuser associated with the electrode of FIG. 5 according to the invention.

DETAILED DESCRIPTION OF PREFERRED EMBODIMENTS

Figure 1:
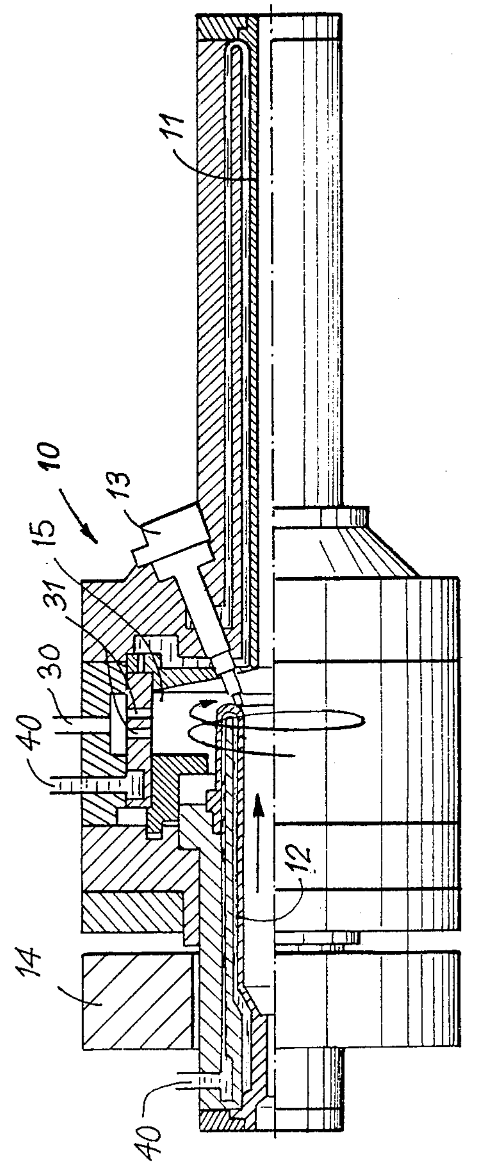
FIG. 1 is a longitudinal semi-sectional and semi-elevational view of an embodiment of a plasma torch according to the conventional technique.

As can be seen more particularly with reference to FIG. 1 of the drawing, a conventional torch 10 comprises various assembled elements. Only those elements which concern the invention directly or indirectly will carry reference characters and will be described. All the other component elements are conventional to one skilled in the art and no further reference thereto will be made.

This torch 10 comprises a downstream electrode 11, an upstream electrode 12, a priming electrode 13 and a coil 14 adapted to produce an axial magnetic field. In the gap between the electrodes, in proximity to the priming electrode 13 is provided a chamber 15 whose function will be explained hereinafter. Such a plasma torch is supplied with power by an electric circuit 200 shown in more detail and diagrammatically in FIG. 2.

The supply of plasma producing gas, for example air, occurs through an orifice 30 of a pipe associated with an injector 31 disposed in the vicinity of the chamber 15.

The supply of plasma producing gas (not shown) is capable of delivering volumes of 500 to 1000 cu.m/hr with respect to normal pressure, under pressures of 8 to 10 bars (0.8 to 1 MPa). It comprises a compressor and remote controlled distribution valves.

Associated with the torch are also for example: a supply of cooling water connected to a nozzle 40 and a control and regulating system (not shown).

The supply of cooling water is capable of delivering 50 cu.m/hr at about 30 bars (3 MPa). It includes a medium pressure pump, remote control distribution valves and a secondary circuit for recovering or discharging the heat received from the torch.

The supply of plasma producing gas, of cooling water and the control and regulation system are moreover conventional and will not be described in more detail. It will merely be mentioned that the control and regulation system comprises sensors, calculators, automatons, a control desk which acts on the electric supply 200 as will be explained hereinafter and the supplies of gas and cooling water respectively, so as to ensure the correct operation of the torch according to requirements imposed thereon.

Figure 2:
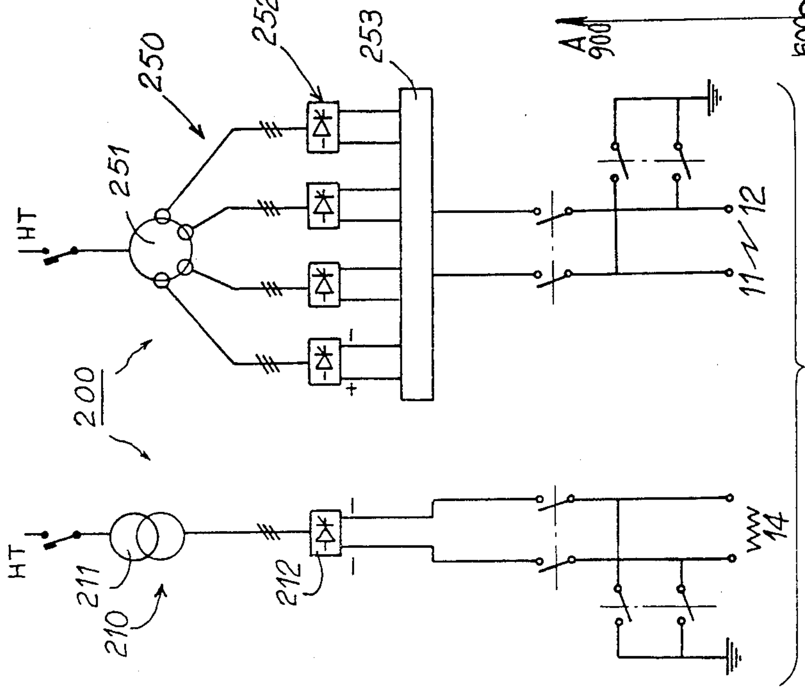
FIG. 2 is a diagram of an electric supply for such a torch improved in accordance with the invention.

Reference will now be made more particularly to FIG. 2 in which the electric supply 200 of a plasma torch is diagrammatically represented.

As can be seen, this supply 200 comprises two distinct circuits: a circuit 210 adapted to supply the coil 14 and a circuit 250 more particularly adapted to supply the arc.

As illustrated, the circuit 210 comprises a transformer 211, for example 100 installed kVA which supplies rectifiers 212 having thyristors and diodes; as indicated hereinafter, these rectifiers deliver the current at the set value of the current supplied to the coil according to the invention. This circuit also comprises disconnecting switches and circuit breakers the function of which is conventional and in respect of which no further description will be given.

The circuit 250 comprises a transformer 251 for example a 2.5 mVA transformer, a series of thyristor and diode rectifiers 252, and an adapting or coupling inductor 253. Here again, conventional disconnecting switches and circuit breakers are shown.

These two circuits 210 and 250 are supplied with high voltage through circuit breakers in the conventional manner.

Such a plasma torch supplied with a direct current of 900 A is capable of delivering a power exceeding about 2 MW.

For operating, such a plasma torch requires, in addition to its power supply for the arc, a source of direct current of 100 kWA installed for merely the supply of the field coil. This field coil is used for producing an induction which has a double function: that of causing the rotation of the flux of ionized particles and that of determining the position of the upstream arc root on the upstream electrode.

Figure 3A:
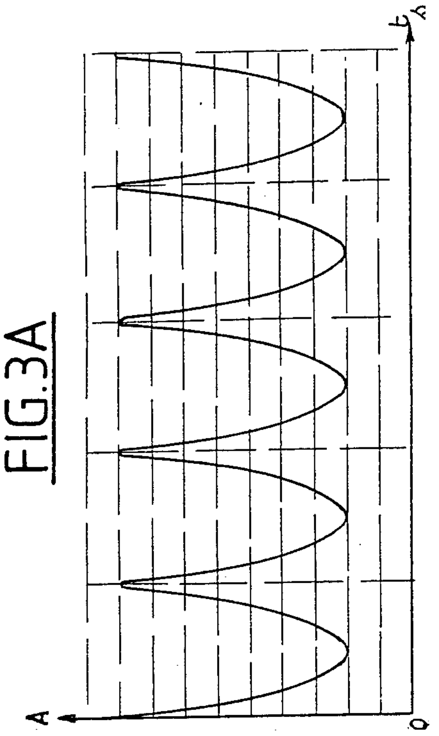
FIGS. 3A, 3B and 3C are curves illustrating the variation of the direct current supplied to the coil according to the invention.
Figure 3B:
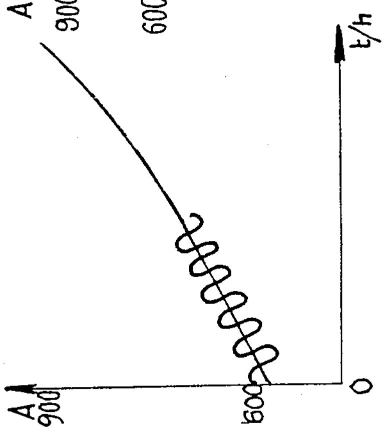
Figure 3C:
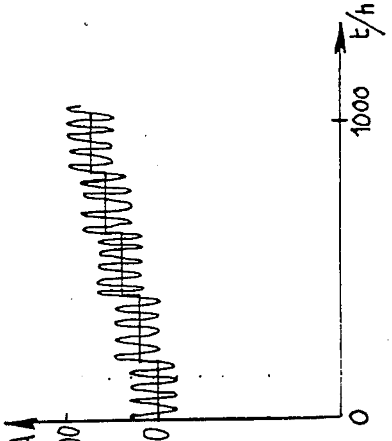

When such a torch operates, it is possible to prolong the life of the upstream electrode by varying, by steps for example of around 50 amperes, the magnitude of the supply of the field coil, for example between 600 and 900 A, the duration of each step being a few hundreds of hours as illustrated in FIG. 3C in which the instantaneous value fluctuates in a pulsatory manner at very low frequency, on the order of 1 Hz, with a constant amplitude which may be between 0 and about 150 A. Below the minimum value which is given by way of example and is a function of the particular torch, the magnetic field is insufficient to stabilize the arc and the latter passes through the median plane of the coil and becomes attached to the closed end of the electrode which rapidly deteriorates. This type of operation results in a wear of the electrode by "sections" which correspond to the different steps of the supply of the field coil each of which determines a particular position of the attachment of the upstream root on the electrode, which position sweeps by successive areas, from one end to the other, the electrode in a single longitudinal translation; the wear results in successive annular grooves which one attempts to render contiguous, each groove occupying axially a few tens of millimeters, namely in all, when added together, a relatively restricted zone of around a hundred millimeters extending between the downstream end and the median plane of the coil, whereas the theoretically utilizable area of the electrode is equal, for example, to three or four times this value, i.e. equal to practically the interior length of the upstream electrode. Thus it can be seen that, in theory, it is of interest to place the coil in such manner that its median plane is in the vicinity of the closed end of the upstream end of the electrode in order to make use of the entire length of the latter. Practical requirements render this almost impossible.

There may also be used steps whose spacings are smaller, the "jumps" being on the order of a few amperes. The mean value of the magnitude of the direct current in the coil then tends to vary in a very progressive manner and it may be given, if need be, the configuration of a "continuous" line (FIG. 3B) and no longer in steps (FIG. 3C) in an increasing or decreasing sense with also an instantaneous value which fluctuates in a pulsatory manner at very low frequency, on the order of 1 Hz, with a constant amplitude which may be between 0 and about 150 A. Such a variation of the direct current is obtained in the conventional manner and a person skilled in the art has many techniques available for attaining this.

To overcome an excessively localized wear of the electrode, the technique according to the invention is employed which uniformizes and extends over substantially the entire length the wear of the upstream electrode and therefore contributes to a prolonging of its life by controlling the displacement of the arc on the upstream electrode.

According to the invention, the arc root of the upstream electrode is made to sweep axially, in particular in a reciprocating manner. To achieve this, according to the invention, the rectifiers 212 are piloted in voltage, for example with the usė of a Graetz bridge, so that the set value of the current which passes through the coil has a pulsatory undulated continuous magnitude of a constant mean value, as shown in FIG. 3A. As can be seen in this Figure, the duration at mid-height of the pulse is about one quarter of that of the period.

This piloting is achieved, for example, by means of a commercially available generator of a voltage 0–10 V operating linearly in such manner that there corresponds to the voltage 0 V, a current magnitude in the coil of about 200 A, and there corresponds to the voltage 10 V, a current magnetude of 1,000 A. This voltage generator is controlled by a microcomputer programmable in accordance with a law established experimentally as indicated hereinafter.

It has been explained that there corresponds to each set value of the magnitude of the current in the coil a well-defined position of the arc root on the upstream electrode. It has been observed that when this set value is made to decrease in evenly spaced apart steps or at a constant pitch, the interval between two corresponding successive positions of the arc root increases. The mathematical function representing this law depends on the geometry of the electrode and on the electromagnetic characteristics of the coil. For any torch of a given configuration, it is possible to produce experimentally by conventional methods the curve which represents the position of the arc root as a function of the magnitude of the current in the coil and write, in the known manner, the equation of such a curve. With this equation and knowing that the upstream arc root is made, according to the invention, to, for example, sweep in an axially regular reciprocating manner with a fixed amplitude and a chosen rhythm, the program of the computer which controls the current in the coil as concerns its magnitude and its frequency is written so that the arc root follows this law. The computer programming techniques are conventional and no further description thereof will be given.

In one embodiment of the invention, a frequency of 1 Hz or less, and a ratio of the maximum and minimum current magnitudes on the order of about 2.5 are chosen. When this curve is approximately parabolic, the magnitude of the current in the coil varies in accordance with FIG. 3A.

It is conventional to rotate the arc root on the electrode by injecting air or any other plasma producing gas in the chamber 15 by means of a vortex flow. The gas is made to whirl along the longitudinal axis in a countercurrent manner with respect to the direction of ejection of the plasma, but this has been found to be completely insufficient.

To avoid the wear and the deterioration of the closed end of the upstream electrode resulting from the attachment of the arc root, according to the invention, the arc root of the upstream electrode is made to sweep axially, possibly in a reciprocating manner and, if necessary, an oscillatory manner. For this purpose, a gas is injected through the end of the upstream electrode with a modulated rate of flow and preferably with a whirling motion. For this purpose, a diffuser is disposed in the vicinity of the end of the upstream electrode so as to supply it with air or a gas whose nature is, for example, the same or different from that of the plasma producing gas, in accordance with a vortex, so as to rotate the upstream arc root in the electrode before the chamber and establish a barrier which prevents the attachment of the arc at the end of the electrode. The rate of flow determines the position of the arc root and the modulation regulates the oscillation of the arc root.

The upstream electrode 120 and the diffuser 131 which is associated therewith according to the invention, are shown in detail in FIGS. 5 and 6.

The upstream electrode comprises a hollow cylindrical body, for example of copper, at the inner end of which is placed, for example, by screwing, the diffuser according to the invention. The tubular cylindrical part has an inside diameter of 70 mm for a length of about 380 mm. While the inner end of the upstream electrodes for high power torches according to the prior art may be considered to be closed since there is merely provided a very small orifice therein for the passage of a pressure sensor, the electrode according to the invention has an end which may be said to be open, since a bore 225 extends therethrough for fixing therein a pipe which injects gas delivered by a secondary supply.

The diffuser 131 diagrammatically shown in perspective in FIG. 6 is for example made from copper alloy. It is in the form of a disc 132 having a diameter of about 65 mm and a thickness on the order of 10 mm. It is extended on one side by a conical portion 133 projecting by about 15 mm. This conical portion has a base 134 of about 50 mm which defines a flange 135 on one side of the disc. As can be seen, the flange 135 is provided with oblique passageways 136 which are for example inclined at 30° to the end face and are evenly spaced apart on the periphery of the flange at an angular pitch of 30° in this embodiment. These inclined passageways having a diameter of about 2 mm have axes which in projection make an angle of 30° between two successive oblique passageways.

In the embodiment shown in FIG. 6, the diffuser has a single ring arrangement of passageways. It is clear that the dimension of the flange may be so chosen as to allow providing therein a plurality of concentric rings of passageways and that the passageways of a given ring or of different rings may not be identical. They may vary by their angular pitch, their inclination relative to the end face, the angle they make between one another, their direction and also their respective size. Cylindrical passageways are shown with a circular cross-section, but there is nothing to oppose providing these passageways with different configurations and profiles, for example they may be conical or biconical so as to form venturi. The choices of these parameters are conventional in aerodynamics; they are for example a function of the flow, the pressure, the velocity, or the rotation of the gas to be chosen.

In the embodiment shown in FIG. 5, the end of the upstream electrode according to the invention is extended toward the exterior by a stem at the end of which a terminal is provided for fixing the pipe supplying the gas to be injected. Other solutions may be envisaged; according to the invention, a bore 125 for the passage of the gas extends through the inner end of the electrode or otherwise the neighbouring electrode wall.

The pressure and the rate of flow of the injected whirling gas determine the place at which the root of the arc is attached. In order to prevent the root of the arc from being attached to the end of the upstream electrode, a minimum rate of flow is required which is a function of the geometry of the torch. For the described and illustrated embodiment, this minimum rate of flow is about 33 g/s. By modulating the injection, preferably the rate of flow, the arc root is made to reciprocate longitudinally; the rate of modulation determines the amplitude of the reciprocation and the choice of the mean value determines the position around which the reciprocation or vibration occurs. Thus it will be understood that, by blowing gas through the end of the upstream electrode, it is possible to cause the root of the arc to describe at will in a reciprocating manner and if need be in an oscillating manner a path throughout, or substantially throughout, the length of the upstream electrode from its downstream end to the diffuser.

The secondary gas supply for blowing gas through the end of the upstream electrode is composed of conventional equipment chosen in accordance with the rates of flow, the pressures and the rate of modulation and the nature of the gas.

It has already been mentioned that, for a constant consumption of electrode, the power of the torch may be increased by increasing the voltage but that in this case the length of the arc also increased. To permit such an increase in the arc length while confining it in a torch which has an unchanged overall size, the gas injected through the end of the electrode is made to whirl.

As can be seen in FIG. 4, a regular wear of the upstream electrode is obtained over a large extent of the electrode. This Figure represents the surface photography to a large scale of a meridian section, with an anamorphosis in which the ordinates are multiplied by a factor 50 relative to the abscissae. The outer surface carries the reference character 122, the inner surface the reference character **123*a*, before operation, and 123*p* after operation. The zone of influence of the coil carries the reference character 121** and the arrow shows the upstream/downstream orientation. It will be observed that the wear is uniform in the appropriate area.

Owing to the invention, the life of the upstream electrode has been prolonged more than fourfold.

It will be clear that the details given concerning the supply of the coil or of the diffuser and the injection of gas through the end of the electrode are only illustrative values and that it is possible to make modifications, changes, or variations for taking into account the incidents of the other parameters which jointly contribute to the good operation of the plasma torch so as to optimize the results in accordance with the use made of the torch and the envisaged purposes.

From the foregoing, it will be understood that the invention resides in the fact of the longitudinal displacement along the axis of the torch, as the case may be in a reciprocating manner and if need be in an oscillating manner, of the upstream root of the arc in the upstream electrode and that this technique may be realized electromagnetically by supplying the coil with a variable and/or pulsatory undulating direct current and/or aerodynamically by injecting through the end of the upstream electrode a gas preferably modulated as concerns its rate of flow and in particular a whirling gas. The means described for carrying out the invention may operate independently or act together for combining their effects. Thus, if the action of the diffuser is preponderant, the ratio of the maximum and minimum magnitudes of the pulsatory direct current in the coil may be on the order of one thousand.

The invention is for example applicable in the iron making industry for the heating or the superheating of the wind at the blast-furnace tuyeres, for the assisted combustion of coal in the blast-furnaces, and in the cement industry for the decarbonation of the raw clay.

The high practical interest of the invention can therefore be seen which, in prolonging the life of the consumable upstream electrode, reduces the interventions for replacing and exchanging the electrode and reduces the costs concerning the supply of parts.

What is claimed is:

1. A process for regulating wear so as to prolong the life of an electrode of a plasma torch comprising a tubular upstream electrode having an inner surface and a tubular downstream electrode having an inner surface relative to a direction of flow of the plasma through the torch, which electrodes are coaxial with each other and between which an arc is established and which are separated by a chamber, said process comprising: injecting a plasma producing gas in said chamber; controlling the displacement of the root of the arc on the upstream electrode so as to cause sweeping of the root longitudinally in a reciprocating manner along a part of said inner surface of the upstream electrode so that the reciprocation occurs at a sweeping frequency of no more than 1 Hz; and causing the upstream arc foot to oscillate on itself, during said sweeping, with an oscillating frequency which is about 10 to 50 times greater than that of said sweeping frequency and with an amplitude of about plus or minus 80 amperes.

2. A process according to claim 1, wherein the upstream electrode has an inner end, said process comprising: in addition to injecting said plasma producing gas, also injecting through said inner end of the upstream electrode additional gas; making said additional gas whirl around the longitudinal axis of the upstream electrode; and modulating the rate of flow of said gas so as to cause the root of the arc to move longitudinally in the upstream electrode, said additional gas being injected with a rate of flow which is one third to one fifteenth of a rate of flow of the plasma producing gas introduced in said chamber.

3. A process according to claim 1, wherein the torch is provided with a coil which locally surrounds the upstream electrode, said process comprising supplying the coil with a variable direct current whose magnitude changes in steps.

4. A process according to claim 3, wherein the magnitude of said variable direct current changes progressively.

5. A process according to claim 3, comprising supplying the coil with a direct current whose magnitude changes in a pulsatory undulatory manner.

6. A process according to claim 5, wherein the pulsatory undulatory direct current has a frequency of no more than 1 Hz.

7. A plasma torch comprising an upstream tubular electrode having an inner surface, a downstream tubular electrode having an inner surface relative to a direction of flow of the plasma through the torch, which electrodes are coaxial with each other, means for establishing an arc between the two electrodes, means defining a chamber separating the electrodes, means for injecting a plasma producing gas in the chamber, means for controlling the displacement of an upstream root of the arc on the upstream electrode relative to the direction of flow of the plasma, so as to cause the root to travel through a longitudinal path in a reciprocating manner whereby wear of the upstream electrode is regularized and the life of the upstream electrode is prolonged, a magnetic field coil which locally surrounds the upstream electrode, an electric circuit for supplying power to the field coil, said means for controlling the displacement of said root comprising, inserted in said circuit, rectifiers delivering a pulsatory undulatory direct current from a set value of pulsatory undulatory coil current having a basic frequency of no more than 1 Hz which is modulated with a modulating frequency which is about 10 to 50 times greater than said basic frequency and with an amplitude of about plus or minus 80 amperes.

8. A torch according to claim 7, wherein said rectifiers produce a pulsatory undulatory current in respect of which the ratio between the maximum and minimum amplitudes varies from 1 to 1000.

9. A torch according to claim 8, wherein said ratio is on the order of 2.5.

10. A torch according to claim 7, wherein said upstream electrode has an inner end, and said means for controlling the displacement of said upstream root comprise:

in the inner end of the upstream electrode, a bore for injecting additional gas; and, placed transversely with respect to the axis of the upstream electrode in proximity to the inner end thereof, a diffuser through which the injected additional gas travels.

11. A torch according to claim 10, wherein said diffuser imparts a whirling motion to the gas which travels therethrough.

12. A torch according to claim 11, wherein said diffuser is formed by a disc through which extend oblique passageways which are oriented substantially tangentially and at equal distances from one another.

13. A torch according to claim 10, wherein rates of flow of the gases injected in the chamber and through the inner end of the upstream electrode are in a ratio of between three and thirteen.

* * * * *